United States Patent
Joshi et al.

(10) Patent No.: US 9,109,456 B2
(45) Date of Patent: Aug. 18, 2015

(54) SYSTEM FOR COUPLING A SEGMENT TO A ROTOR OF A TURBOMACHINE

(75) Inventors: Manish Joshi, Karnataka (IN); Robert Edward Deallenbach, Flat Rock, NC (US)

(73) Assignee: General Electric Company, Schenectady, NY (US)

( * ) Notice: Subject to any disclaimer, the term of this patent is extended or adjusted under 35 U.S.C. 154(b) by 795 days.

(21) Appl. No.: 13/282,141

(22) Filed: Oct. 26, 2011

(65) Prior Publication Data

US 2013/0108449 A1 May 2, 2013

(51) Int. Cl.
*F01D 5/14* (2006.01)
*F01D 5/30* (2006.01)

(52) U.S. Cl.
CPC .............. *F01D 5/3007* (2013.01); *F01D 5/147* (2013.01); *F05D 2220/31* (2013.01); *Y02T 50/671* (2013.01)

(58) Field of Classification Search
CPC ......... F01D 5/30; F01D 5/3023; F01D 5/303; F01D 5/3038; F01D 5/147; F01D 5/3007; Y02T 50/671
USPC ............................... 416/219 R, 215, 216, 232
See application file for complete search history.

(56) References Cited

U.S. PATENT DOCUMENTS

| | | | |
|---|---|---|---|
| 1,165,005 A | | 12/1915 | Herr |
| 1,638,648 A | * | 8/1927 | Trotter et al. .................. 416/217 |
| 4,595,340 A | * | 6/1986 | Klassen et al. ............ 416/193 A |
| 5,308,227 A | | 5/1994 | Gros et al. |
| 6,033,186 A | * | 3/2000 | Schilling et al. .............. 416/233 |
| RE37,900 E | | 11/2002 | Partington |
| 6,755,986 B2 | * | 6/2004 | Anding et al. ............ 416/244 A |
| 7,118,346 B2 | * | 10/2006 | Read ............................. 416/232 |
| 7,186,074 B2 | | 3/2007 | Blatchford et al. |
| 7,251,888 B2 | * | 8/2007 | Schreiber ................... 29/889.72 |
| 7,261,518 B2 | | 8/2007 | Golinkin et al. |
| 7,300,247 B2 | | 11/2007 | Nomura et al. |
| 7,334,997 B2 | * | 2/2008 | Karafillis ...................... 416/224 |
| 7,513,747 B2 | * | 4/2009 | Bachofner et al. ............ 416/215 |
| 2004/0086387 A1 | | 5/2004 | Fitts et al. |
| 2006/0024155 A1 | | 2/2006 | Blatchford et al. |

* cited by examiner

*Primary Examiner* — Dwayne J White
*Assistant Examiner* — William Grigos
(74) *Attorney, Agent, or Firm* — Fletcher Yoder P.C.

(57) ABSTRACT

Embodiments of the present disclosure include a system having a turbine blade segment having a blade and a mounting segment coupled to the blade. The mounting segment is configured to couple to a slot in a rotor, and the mounting segment has a cavity extending radially into the mounting segment.

23 Claims, 3 Drawing Sheets

SYSTEM FOR COUPLING A SEGMENT TO A ROTOR OF A TURBOMACHINE

BACKGROUND OF THE INVENTION

The subject matter disclosed herein relates to turbomachines, and, more particularly, to dovetail joints for attaching turbomachine blades to a turbomachine rotor.

Turbomachines include compressors and turbines, such as gas turbines, steam turbines, and hydro turbines. Generally, turbomachines include a rotor, which may be a shaft or drum, to which turbomachine blades are attached. For example, the turbomachine blades may be attached to the rotor by a dovetail joint. Specifically, the base of each turbomachine blade may include teeth or hooks, which are received by similarly shaped cavities or recesses in the turbomachine rotor. Unfortunately, in some embodiments, due to the length and size of the turbomachine blades, mechanical loads, as well as other operating conditions of the turbine, the dovetail joint may experience high stresses which can reduce the useful life of the dovetail joint.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a steam turbine blade segment having a blade and a mounting segment coupled to the blade. The mounting base is configured to couple to a slot in a rotor, and the mounting segment has a cavity extending radially into the mounting segment.

In a second embodiment, a system includes a turbine blade segment having a turbine blade and a dovetail joint coupled to the turbine blade. The dovetail joint is configured to couple the turbine blade to a rotor and the dovetail joint includes a cavity extending radially into the dovetail joint. The cavity is configured to reduce stress on the turbine blade segment associated with rotation of the turbine blade segment.

In a third embodiment, a system includes a turbomachine blade segment having a blade and a mounting base coupled to the blade. The mounting base comprises a cavity extending one way radially into the mounting base without penetrating an exterior surface of the blade.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include a turbomachine blade mounting segment (e.g., a dovetail joint) for coupling a turbomachine blade to a drum rotor of a turbomachine, wherein the mounting segment (e.g., dovetail joint) has a radial hole extending radially into the mounting segment. Specifically, the radial hole is formed in a base of the dovetail joint and extends radially through the dovetail joint toward the turbomachine blade. The radial hole may serve to reduce the weight of the dovetail joint. In this manner, the centrifugal load of the dovetail joint, when the turbomachine is in operation, may be reduced. As a result, stresses experienced by the dovetail joint, the drum rotor of the turbomachine, and the turbomachine blade may be reduced, thereby increasing the useful life of the dovetail joint, the drum rotor, and the turbomachine blade. As discussed in detail below, the radial hole formed in the dovetail joint may have a variety of widths, lengths, sizes, and configurations. In this manner, the weight reduction of the dovetail joint may be customized and tailored for different turbomachine applications. While the dovetail joints described below may be used with any of a variety of turbomachines (e.g., turbines and compressors) the following discussion describes improved dovetail joints in the context of a turbine, such as a steam turbine or a gas turbine.

Figure 1:
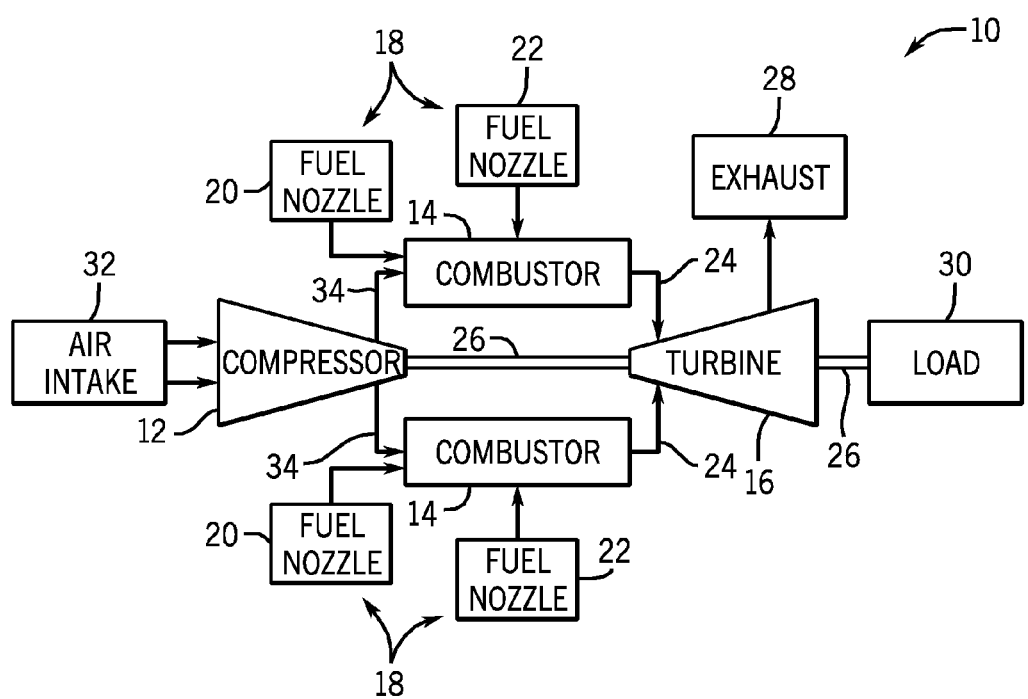
FIG. 1 is a schematic block diagram of an embodiment of a turbine engine system.

Turning now to the drawings, FIG. 1 illustrates a block diagram of an embodiment of a gas turbine system 10 having various turbomachines that are equipped with improved mounting segments (e.g., dovetail joints). The diagram includes a compressor 12, turbine combustors 14, and a turbine 16. The turbine combustors 14 include fuel nozzles 18 which route a liquid fuel and/or gas fuel, such as natural gas or syngas, into the turbine combustors 14. As shown, each turbine combustor 14 may have multiple fuel nozzles 18. More specifically, the turbine combustors 14 may each include a primary fuel injection system having primary fuel nozzles 20 and a secondary fuel injection system having secondary fuel nozzles 22.

The turbine combustors 14 ignite and combust an air-fuel mixture, and then pass hot pressurized combustion gasses 24 (e.g., exhaust) into the turbine 16. Turbine blades are coupled to a shaft 26, which is also coupled to several other components throughout the turbine system 10. As discussed in detail below, the turbine blades may be coupled to the shaft 26 by improved mounting segments (e.g., dovetail joints). As the combustion gases 24 pass through the turbine blades in the turbine 16, the turbine 16 is driven into rotation, which causes the shaft 26 to rotate. Eventually, the combustion gases 24 exit the turbine system 10 via an exhaust outlet 28. Further, the shaft 26 may be coupled to a load 30, which is powered via rotation of the shaft 26. For example, the load 30 may be any suitable device that may generate power via the rotational output of the turbine system 10, such as a power generation plant or an external mechanical load. For instance, the load 30 may include an electrical generator, a propeller of an airplane, and so forth.

In an embodiment of the turbine system 10, compressor blades are included as components of the compressor 12. The blades within the compressor 12 are coupled to the shaft 26, and will rotate as the shaft 26 is driven to rotate by the turbine 16, as described above. As discussed similarly above, the compressor blades may also be coupled to the shaft 26 with improved mounting segments (e.g., dovetail joints). The rotation of the blades within the compressor 12 compress air from an air intake 32 into pressurized air 34. The pressurized air 34 is then fed into the fuel nozzles 18 of the combustors 14. The fuel nozzles 18 mix the pressurized air 34 and fuel to produce a suitable mixture ratio for combustion (e.g., a combustion that causes the fuel to more completely burn) so as not to waste fuel or cause excess emissions. While the dovetail joints described below may be used with any of a variety of turbomachines (e.g., compressors 12 and turbines 16) the following discussion describes dovetail joints in the context of the turbine 16 (e.g., a gas turbine or a steam turbine).

Figure 2:
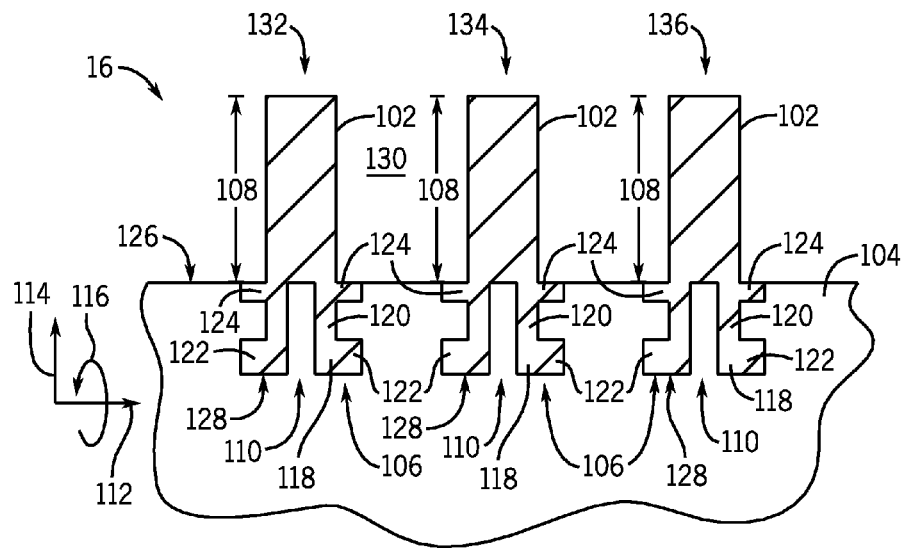
FIG. 2 is a partial cross-sectional side view of a turbomachine (e.g., a turbine or compressor), illustrating axially mounted turbomachine blades having dovetail joints, in accordance with embodiments of the present disclosure.

FIG. 2 is a partial cross-sectional view of the turbine 16 having turbine blades 102 coupled to a drum rotor 104, illustrating mounting segments 106 (e.g., dovetail joints) of the turbine blades 102. Due to a variety of factors, such as operating conditions and lengths 108 of the turbine blades 102, each turbine blade 102 and its mounting segment 106 may experience undesirable stresses. As discussed in detail below, the mounting segment 106 of each turbine blade 102 includes a radial hole 110 to help reduce and overcome the stresses experienced by the mounting segment 106. As shown, the radial hole 110 extends radially into the mounting segment 106 of the turbine blade 102. In the following discussion, reference may be made to an axial 112 direction of the turbine 16, a radial 114 direction of the turbine 16, and a circumferential 116 direction of the turbine 16.

As mentioned above, each turbine blade 102 is mounted to the drum rotor 104 with a mounting segment 106 (e.g., a dovetail joint). Specifically, the mounting segment 106 of each turbine blade 102 is inserted inside the drum rotor 104 of the turbine 16 and secures the turbine blade 102 to the drum rotor 104. In the illustrated embodiment, each mounting segment 106 has a T-shape, or "T-route", configuration. Specifically, each mounting segment 106 includes a head 118 and a neck 120, which are disposed internal to the drum rotor 104 when the mounting segment 106 is coupled to the rotor 104.

As shown, the head 118 of each mounting segment 106 includes two hooks 122 that extend laterally from the head 118 and the neck 120. In this manner, the head 118, the neck 120 and the hooks 122 form the T-shape configuration of each mounting segment 106. In other embodiments, the mounting segments 106 may include more than two hooks 122 extending laterally from the head 118 and neck 120. For example, the mounting segments 106 may include approximately 4 to 20, 6 to 18, 8 to 16, or 10 to 14 hooks 122. As will be appreciated, the T-shape configuration enables the turbine blades 102 to be circumferentially 116 mounted to the drum rotor 104. Specifically, the drum rotor 104 includes circumferential slots 123 or mounting recesses configured to receive the T-shaped mounting segments 106. In the illustrated embodiment, the mounting segments 106 are mounted in the circumferential 116 direction. For example, the mounting segments 106 may be radially 114 inserted into the slots 123 of the drum rotor 104, and then circumferentially 116 moved along the slots 123 of the drum rotor 104.

In the illustrated embodiment, each mounting segment 106 further includes anti-rotation ridges 124. Specifically, the anti-rotation ridges 124 extend laterally from the neck 120 and on opposite sides of the mounting segment 106. As shown, the anti-rotation ridges 124 are configured to be disposed within the slots 123 or mounting recesses of the drum rotor 104 and are generally flush with an outer surface 126 of the drum rotor 104 when the mounting segment 106 is coupled to the drum rotor 104. As will be appreciated, the anti-rotation ridges 124 may reduce rotation or pivoting of the dovetail 106 within the drum rotor 104, thereby increasing the stability and rigidity of the turbine blade 102. In certain embodiments, the mounting segment 106 may not include anti-rotation ridges 124.

As mentioned above, each mounting segment 106 includes a radial hole 110. More specifically, the radial hole 110 is formed in a base 128 of the mounting segment 106. The radial hole 110 extends into the head 122 and into the neck 120 of the mounting segment 106 in the radial 114 direction. In the illustrated embodiment, the radial hole 110 extends into the mounting segment 106, but does not extend into the turbine blade 102. However, in other embodiments, the radial hole 110 may extend entirely through the mounting segment 106 and into the turbine blade 102. As shown, the radial hole 110 is not open and is not a loop. In other words, the radial hole 110 is closed and does not extend into a hot gas path 130 or other section of the turbine 16. In other words, the radial hole 110 does not penetrate an exterior surface 131 of the turbine blade 102. For example, the radial hole 110 may not serve as a coolant flow path. The radial hole 110 may be formed using a variety of machining or manufacturing processes. For example, the radial hole 110 may be forged, electrochemically machined, electrical discharge machined, or other process. As discussed in detail below, the radial hole 110 may have a variety of different shapes, configurations, and sizes.

As mentioned above, a variety of factors, such as operating conditions and lengths 108 of the turbine blades 102, cause the turbine blade 102 and its mounting segment 106 to experience undesirable stresses. The formation of the radial hole 110 in the mounting segment 106 may serve to reduce the stresses experienced by the turbine blade 102, the mounting segment 106, and the drum rotor 104. Specifically, the formation of the radial hole 110 in the mounting segment 106 reduces the weight of the mounting segment 106. As a result, the centrifugal load on the mounting segment 106 is reduced when the turbine 16 is in operation. In this manner, the stresses experienced by the mounting segment 106, the drum rotor 104, and the turbine blade 102 may also be reduced.

Consequently, the useful life of the mounting segments 106, turbine blades 102, and drum rotor 104 may be extended. Moreover, the stresses experienced by the turbine blades 102 and their mounting segments 106 may vary across different stages of the turbine blades 102. As used herein, a "stage" of turbine blades 102 refers to those turbine blades 102 extending around a circumference 116 of the drum rotor 104 at a certain axial 112 location along the drum rotor 104. In certain embodiments, a first turbine blade stage 132 may have different operating conditions and/or turbine blades 102 with different lengths 108 than those of a second turbine blade stage 134 or a third turbine blade stage 136. As a result, the stresses experienced by the mounting segments 106 in each stage 132, 134, and 136 may vary. To attenuate the different stresses in the first, second, and third stages 132, 134, and 136, the radial holes 110 formed in the mounting segments 106 in each of the respective stages 132, 134, and 136 may vary in size, shape, and configuration.

Figure 3:
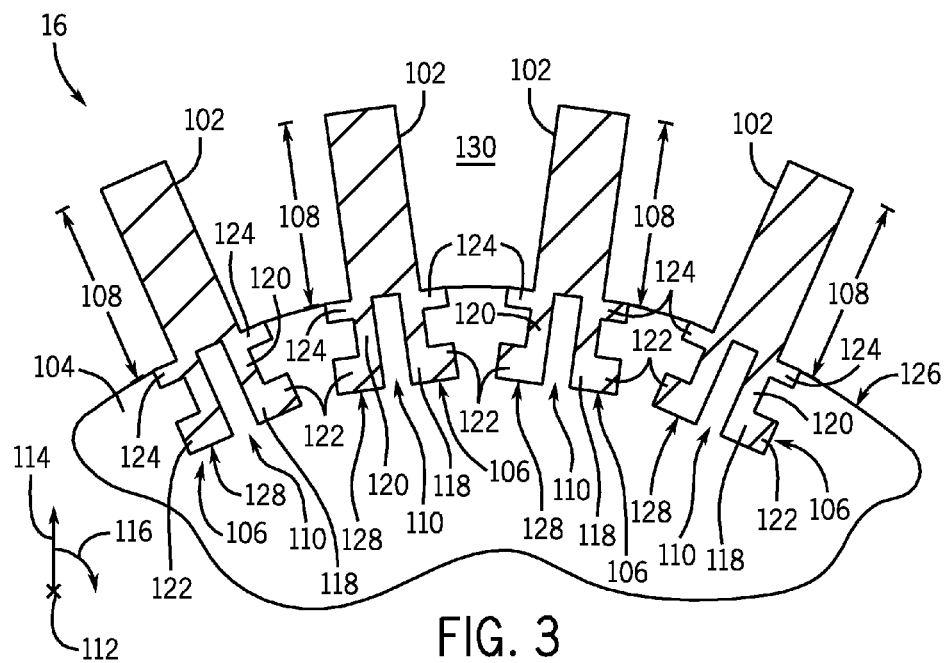
FIG. 3 is a partial cross-sectional side view of a turbomachine, illustrating circumferentially mounted turbomachine blades having dovetail joints, in accordance with embodiments of the present disclosure.

FIG. 3 is a partial cross-sectional view of the turbine 16 having turbine blades 102 coupled to the drum rotor 104, illustrating mounting segments 106 (e.g., dovetail joints) of the turbine blades 102. Specifically, the illustrated embodiment shows turbine blades 102 coupled about a circumference 116 of the drum rotor 104. In other words, the turbine blades 102 shown in FIG. 3 are part of the same stage. For example, the turbine blades 102 may be part of the first, second, or third turbine blade stage 132, 134, or 136. The illustrated embodiment further includes similar elements and element numbers as the embodiment shown in FIG. 2.

As discussed above, the mounting segments 106 have a T-shape configuration. That is, each mounting segment 106 includes the neck 120 and the head 122 to form a T-shaped mount for each turbine blade 102. Additionally, each mounting segment 106 includes the radial hole 110 extending into the head 122 and the neck 120 of the mounting segment 106. The T-shape configuration of the mounting segments 106 enables the turbine blades 102 to be circumferentially 116 or axially 112 mounted to the drum rotor 104. As discussed above, the drum rotor 104 includes slots 123 or mounting recesses configured to receive the T-shaped mounting segments 106. In the illustrated embodiment, the mounting segments 106 are mounted in the axial 112 direction into axial slots 123 or mounting recesses. In other words, the mounting segments 106 are inserted into the drum rotor 104 and mounted in the axial 112 direction. As discussed above, the radial hole 110 in each mounting segment 106 may serve to reduce stresses experienced by the turbine blade 102, the drum rotor 104, and the mounting segment 106. Specifically, the radial hole 110 reduces the weight of the mounting segment 106, which thereby reduces the centrifugal load on the mounting segment 106 when the turbine 16 is in operation. As discussed in detail below, the radial hole 110 may have a variety of different shapes, configurations, and sizes.

Figures 4, 5:
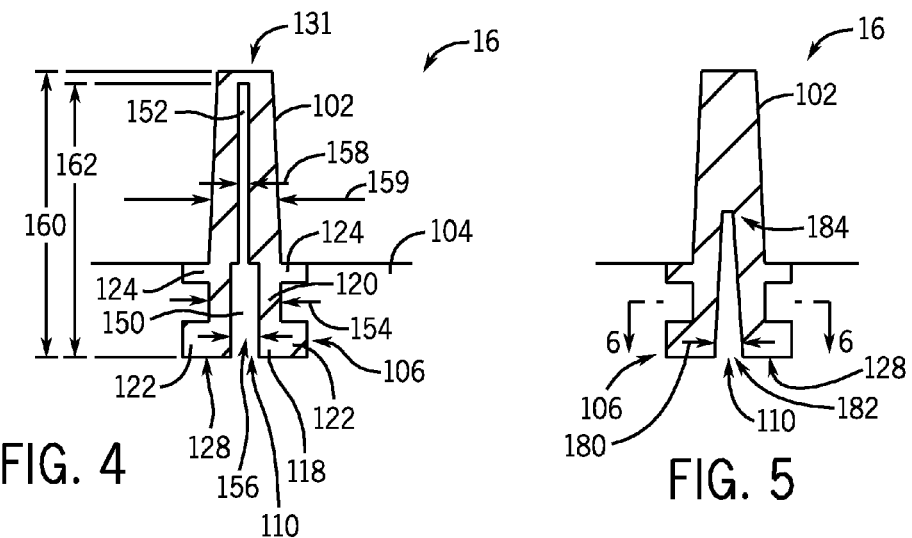
FIG. 4 is a cross-sectional side view of a turbomachine blade, illustrating an embodiment of a dovetail joint.
FIG. 5 is a cross-sectional side view of a turbomachine blade, illustrating an embodiment of a dovetail joint.

FIG. 4 is a cross-sectional side view of the turbine blade 102, illustrating an embodiment of the mounting segment 106 (e.g., dovetail joint) having the radial hole 110. Specifically, the radial hole 110 includes a first portion 150 extending through the mounting segment 106 and a second portion 152 extending into the turbine blade 102. In the illustrated embodiment, the width of the first portion 150 (i.e., the portion formed in the mounting segment 106) is greater than the width of the second portion 152 (i.e., the portion formed in the turbine blade 102). In certain embodiments, the first and second portions 150 and 152 may be coaxial. Furthermore, other embodiments of the radial hole 110 may include additional portions (e.g., third, fourth, and/or fifth portions), which may also be coaxial. As will be appreciated, the inclusion of the second portion 152 further reduces the weight of the turbine blade 102. In this manner, the centrifugal load of the turbine blade 102 and the mounting segment 106 is further reduced when the turbine 16 is in operation, thereby further reducing stresses in the mounting segment 106, the drum rotor 104, and the turbine blade 102. In other embodiments, the radial hole 110 may include only the first portion 150 extending through the mounting segment 106 and not the second portion 152 extending into the turbine blade 102.

As shown, the neck 120 of the mounting segment 106 has a width 154 (e.g., a lateral cross-section). Similarly, the first portion 150 of the radial hole 110 has a width 156. In certain embodiments, the width 156 of the first portion 150 may be measured as a percentage of the width 154 of the neck 120 of the mounting segment 106. For example, the width 156 may be approximately 30 to 80, 35 to 75, 40 to 70, 45 to 65, or 50 to 60 percent of the width 154 of the neck 120 of the dovetail 106. Additionally, the second portion 152 of the radial hole 110 has a width 158. As mentioned above, in the illustrated embodiment, the width 158 of the second portion 152 is less than the width 156 of the first portion 150. For example, the width 158 may be approximately 30 to 80, 35 to 75, 40 to 70, 45 to 65, or 50 to 60 percent of a width 159 of the turbine blade 102. As will be appreciated, the widths 156 and 158 may be constant. In other embodiments, the widths 156 and 158 may vary.

Furthermore, the turbine blade 102 and mounting segment 106 have a combined length 160. Similarly, the radial hole 110 has an overall length 162. As with the width 156 of the first portion 150 of the radial hole 110, the overall length 162 of the radial hole 110 may be measured as a percentage of the combined length 160 of the turbine blade 102 and the mounting segment 106. For example, the overall length 162 of the radial hole 110 may be approximately 5 to 95, 15 to 85, 25 to 75, 35 to 65, or 45 to 55 percent of the combined length 160 of the turbine blade 102 and the mounting segment 106. In other words, in certain embodiments, the radial hole 110 may extend partially into the mounting segment 106, entirely through the mounting segment 106, or entirely through the mounting segment 106 and into the turbine blade 102. Additionally, as discussed above, in certain embodiments, the radial hole 110 does not extend entirely through the turbine blade 102.

FIG. 5 is a cross-sectional side view of the turbine blade 102, illustrating an embodiment of the mounting segment 106 (e.g., dovetail joint) having the radial hole 110 extending through the mounting segment 106 and into the turbine blade 102. More specifically, the radial hole 110 in the illustrated embodiment has a non-constant width 180. In other words, the size of the radial hole 110 varies between a bottom 182 of the radial hole 110 (i.e., at the base 128 of the mounting segment 106) and a top 184 of the radial hole 110. In particular, the radial hole 110 has a tapered configuration (e.g., conical). That is, a lateral cross-section of the radial hole 110 is largest at the bottom 182 of the radial hole 110 and smallest at the top 184 of the radial hole 110, and the lateral cross-section of the radial hole 110 decreases at a constant and gradual rate. In other embodiments, the radial hole 110 may have other configurations and non-constant widths. For example, the radial hole 110 may curve from the bottom 182 to the top 184 of the hole 110.

Figure 6:
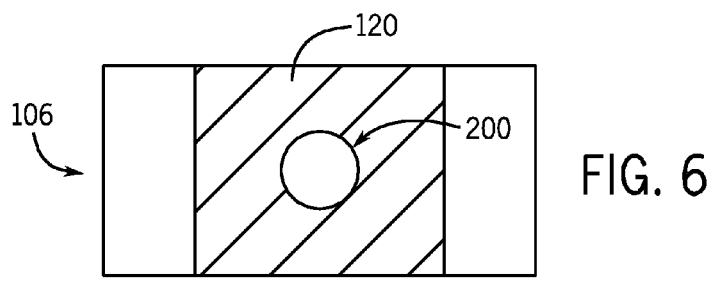
FIG. 6 is a bottom cross-sectional view, taken along line 6-6 of FIG. 5, of an embodiment a dovetail joint of a turbomachine blade.
Figure 7:
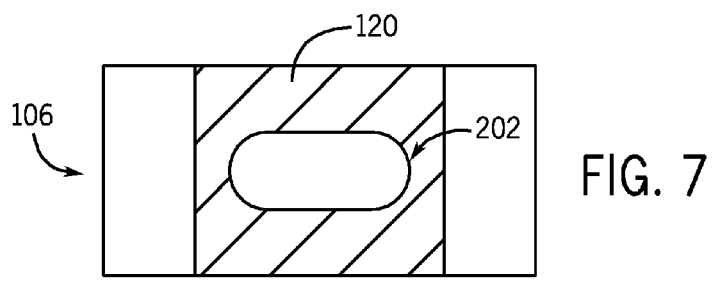
FIG. 7 is a bottom cross-sectional view, taken along line 6-6 of FIG. 5, of an embodiment a dovetail joint of a turbomachine blade.
Figure 8:
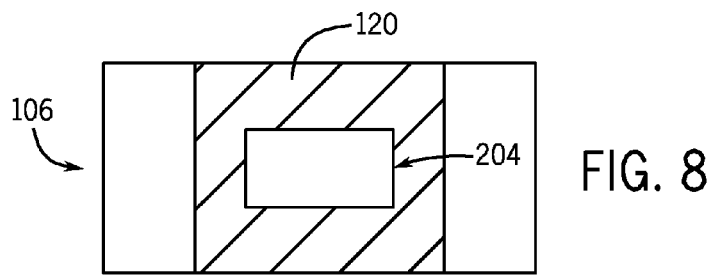
FIG. 8 is a bottom cross-sectional view, taken along line 6-6 of FIG. 5, of an embodiment a dovetail joint of a turbomachine blade.

FIGS. 6, 7, and 8 are cross-sectional bottom views, taken along line 6-6 of FIG. 5, illustrating various embodiments of the mounting segment 106 (e.g., dovetail joint) of the turbine blade 102. Specifically, the illustrated embodiments show different shapes of the radial hole 110. For example, FIG. 6 illustrates a circular radial hole 200 formed in the mounting segment 106. Other embodiments of the mounting segment 106 may have radial holes 110 of other shapes formed in the base 128 of the mounting segment 106. FIG. 7 shows an embodiment of the mounting segment 106 with an oval-shaped radial hole 202. Similarly, FIG. 8 illustrates an embodiment of the mounting segment 106 with a rectangular radial hole 204. As will be appreciated, other embodiments of the mounting segment 106 may include radial holes 110 having other shapes. For example, the radial hole 110 in the mounting segment 106 may be triangular, hexagonal, octagonal, and so forth.

As discussed in detail above, the disclosed embodiments include the mounting segment 106 mounting portion of the turbine blade 102 having the radial hole 110 formed in the mounting segment 106 and extending radially 114 into the mounting segment 106. Specifically, the radial hole 110 serves to reduce the weight of the mounting segment 106. In this manner, the centrifugal load of the mounting segment 106 when the turbine 16 is in operation may be reduced. As a result, stresses experienced by the mounting segment 106, the drum rotor 104 of the turbine 16, and the turbine blade 102 may be reduced, thereby increasing the useful life of the mounting segment 106, the drum rotor 104, and the turbine blade 102. As will be appreciated, the radial hole 110 formed in the mounting segment 106 may have a variety of widths, lengths, sizes, and configurations. In this manner, the weight reduction of the mounting segment 106 may be customized and tailored for different turbine 16 applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a steam turbine blade segment comprising:
   a blade;
   a mounting segment coupled to the blade, wherein the mounting segment is configured to couple to a slot in a rotor; and
   a multi-size cavity extending in a radial direction into the mounting segment to a depth in the steam turbine blade segment, wherein the multi-size cavity comprises a first portion followed by a second portion in the radial direction, the first portion has a first constant lateral cross-section along a first axis, the second portion has a second constant lateral cross-section along a second axis, the second constant lateral cross-section is sized less than the first constant lateral cross-section, the second axis extends along the first axis, and the second portion extends in the radial direction to a distal end of the multi-size cavity at the depth.

2. The system of claim 1, wherein the mounting segment comprises a dovetail joint.

3. The system of claim 1, wherein the multi-size cavity extends entirely through the mounting segment.

4. The system of claim 3, wherein the multi-size cavity extends at least partially into the blade.

5. The system of claim 1, comprising a steam turbine having the steam turbine blade segment.

6. The system of claim 1, wherein the first constant lateral cross-section and the second constant lateral cross-section are disposed directly one after another in the radial direction.

7. The system of claim 1, wherein the first portion is disposed in the mounting segment and the second portion is disposed in the blade.

8. The system of claim 1, wherein the first constant lateral cross-section is circular and the second constant lateral cross-section is circular.

9. The system of claim 1, wherein the multi-size cavity does not extend through an exterior surface of the blade.

10. The system of claim 1, wherein the multi-size cavity is formed by a forging, machining, electrochemical, or electrical discharge process.

11. A system, comprising:
    a turbine blade segment, comprising:
    a blade;
    a dovetail joint coupled to the turbine blade, wherein the dovetail joint is configured to couple the turbine blade to a rotor; and
    a multi-size cavity extending in a radial direction into the dovetail joint to a depth in the turbine blade segment, wherein the cavity is configured to reduce stress on the turbine blade segment associated with rotation of the turbine blade segment, the multi-size cavity comprises a first portion followed by a second portion in the radial direction, the first portion has a first constant lateral cross-section along a first axis, the second portion has a second constant lateral cross-section along a second axis, the second constant lateral cross-section is sized less than the first constant lateral cross-section, the second axis extends along the first axis, and the second portion extends in the radial direction to a distal end of the multi-size cavity at the depth.

12. The system of claim 11, wherein the turbine blade segment is a steam turbine blade segment.

13. The system of claim 11, comprising the rotor or a turbine having the rotor, wherein the dovetail joint is configured to mount in a slot along the rotor, and the slot extends axially or circumferentially relative to a rotational axis of the rotor.

14. The system of claim 11, wherein the multi-size cavity extends through the dovetail joint and into the turbine blade.

15. The system of claim 11, wherein the dovetail joint has a plurality of lateral hooks.

16. The system of claim 11, wherein the turbine blade segment has only a single one of the multi-size cavity extending in the radial direction into the dovetail joint, wherein the multi-size cavity is symmetrical about a radial axis of the dovetail joint.

17. A system, comprising:
    a steam turbine blade segment, comprising:
    a blade; and
    a mounting base coupled to the blade, wherein the mounting base comprises a multi-size cavity extending one way in a radial direction into the mounting base to a depth without penetrating an exterior surface of the blade, the multi-size cavity comprises a first portion followed by a second portion in the radial direction, the first portion has a first constant lateral cross-section along a first axis, the second portion has a second constant lateral cross-section along a second axis, the second constant lateral cross-section is sized less than the first constant lateral cross-section, the second axis extends along the first axis, and the second portion extends in the radial direction to a distal end of the multi-size cavity at the depth.

18. The system of claim 17, wherein the turbomachine blade segment is a steam turbine blade segment.

19. The system of claim 17, wherein the multi-size cavity is configured to reduce stress on the turbomachine blade segment associated with rotation of the turbomachine blade segment.

20. The system of claim 17, comprising a turbine or compressor having the turbomachine blade segment.

21. The system of claim 17, wherein a first width of the first portion is between 30 to 80 percent of a second width of a neck of the mounting base.

22. The system of claim 17, wherein the first constant lateral cross-section is circular and the second constant lateral cross-section is circular.

23. The system of claim 17, wherein the turbomachine blade segment comprises only a single one of the multi-size cavity extending in the radial direction into the mounting base, wherein the multi-size cavity is symmetrical about a radial axis of the mounting base.

* * * * *